(12) United States Patent
Dooley

(10) Patent No.: US 7,793,505 B2
(45) Date of Patent: Sep. 14, 2010

(54) GAS TURBINE ENGINE OIL SYSTEM OPERATION

(75) Inventor: Kevin Allan Dooley, Mississauga (CA)

(73) Assignee: Pratt & Whitney Canada Corp, Longueiil (CA)

( * ) Notice: Subject to any disclaimer, the term of this patent is extended or adjusted under 35 U.S.C. 154(b) by 892 days.

(21) Appl. No.: 11/381,633

(22) Filed: May 4, 2006

(65) Prior Publication Data
US 2007/0256421 A1 Nov. 8, 2007

(51) Int. Cl.
F02C 1/00 (2006.01)

(52) U.S. Cl. .................. 60/772; 60/39.08; 60/778; 184/6.11

(58) Field of Classification Search ............. 60/39.08, 60/39.83, 772, 778, 802; 184/6.11; 310/52, 310/54, 62, 63
See application file for complete search history.

(56) References Cited

U.S. PATENT DOCUMENTS

| 3,769,790 | A | | 11/1973 | Thebert |
| 4,002,224 | A | | 1/1977 | Easter |
| 4,309,870 | A | | 1/1982 | Guest et al. |
| 4,629,033 | A | | 12/1986 | Moore et al. |
| 5,105,875 | A | * | 4/1992 | McArthur .................. 60/39.83 |
| 5,184,456 | A | | 2/1993 | Rumford et al. |
| 5,253,470 | A | | 10/1993 | Newton |
| 6,886,324 | B1 | | 5/2005 | Handshuh et al. |
| 7,216,473 | B1 | * | 5/2007 | McArthur et al. .......... 60/39.08 |
| 2005/0081507 | A1 | | 4/2005 | Tumelty et al. |
| 2006/0005547 | A1 | * | 1/2006 | Brouillet ...................... 60/802 |
| 2006/0032261 | A1 | | 2/2006 | Robinson et al. |
| 2006/0081419 | A1 | * | 4/2006 | Care et al. ................. 184/6.11 |

FOREIGN PATENT DOCUMENTS

EP 1683947(A2) 7/2006

OTHER PUBLICATIONS

International Search Report PCT/CA2007/000555, Jul. 12, 2007.

* cited by examiner

Primary Examiner—Michael Cuff
Assistant Examiner—Phutthiwat Wongwian
(74) Attorney, Agent, or Firm—Ogilvy Renault LLP

(57) ABSTRACT

A method of operating a gas turbine engine having at least one electric machine associated therewith, the engine having an oil system communicating with an electric oil pump, at least one bearing cavity of the engine and a coolant passage of the electric machine, the method comprising the step of pumping oil intermittently to the oil system to cool the electric machine.

13 Claims, 3 Drawing Sheets

GAS TURBINE ENGINE OIL SYSTEM OPERATION

TECHNICAL FIELD

The invention relates to gas turbine engines, in more particularly to a method for lubricating a gas turbine engine.

BACKGROUND

A gas turbine engine comprises a plurality of rotating elements, such as shafts, rotating at a very high rotation speed when the engine is running. These rotating elements are supported by bearings provided at various strategic locations in the engine. These bearings are lubricated using pressurized oil. Oil is sent to the bearing cavities using oil pumps that are mechanically driven and as a result will start to pump oil to the bearings as soon as the engine starter is engaged. One drawback is that when starting the engine or during the run down, the air-oil seals of bearing cavities are inefficient because of the lack of sufficient air pressure. This may result in oil leaks, which is undesirable.

SUMMARY

In one aspect, the present invention provides a method of operating a gas turbine engine having a combustor and at least one turbine shaft drivingly connected to an electric machine, the engine also having an oil system communicating with an electric oil pump, at least one bearing cavity of the engine and a coolant passage of the electric machine, the method comprising: rotating the shaft while the combustor is unlit; controlling the oil pump to intermittently provide oil flow to the oil system for cooling the electric machine.

In another aspect, the present invention provides a method of operating a gas turbine engine having a motor/generator drivingly connected to a turbine shaft, the engine having an oil system communicating with an electric oil pump, at least one bearing cavity of the engine and a coolant passage of the motor/generator, the method comprising: rotating the shaft with the motor/generator; pumping oil to provide an intermittent oil flow to the oil system; providing pumped oil to the motor/generator for cooling; lighting the engine; and then pumping oil to provide a continuous oil flow to the oil system.

In another aspect, the present invention provides a method of operating a gas turbine engine having a combustor and at least one electric machine, the engine having an oil system communicating with an electric oil pump, at least one bearing cavity of the engine and a coolant passage of the electric machine, the method comprising the step of pumping oil intermittently to the oil system to cool the electric machine.

BRIEF DESCRIPTION OF THE FIGURES

For a better understanding of the invention, and to show more clearly how it may be carried into effect, reference will now be made by way of example to the accompanying figures, in which.

DETAILED DESCRIPTION

Figure 1:
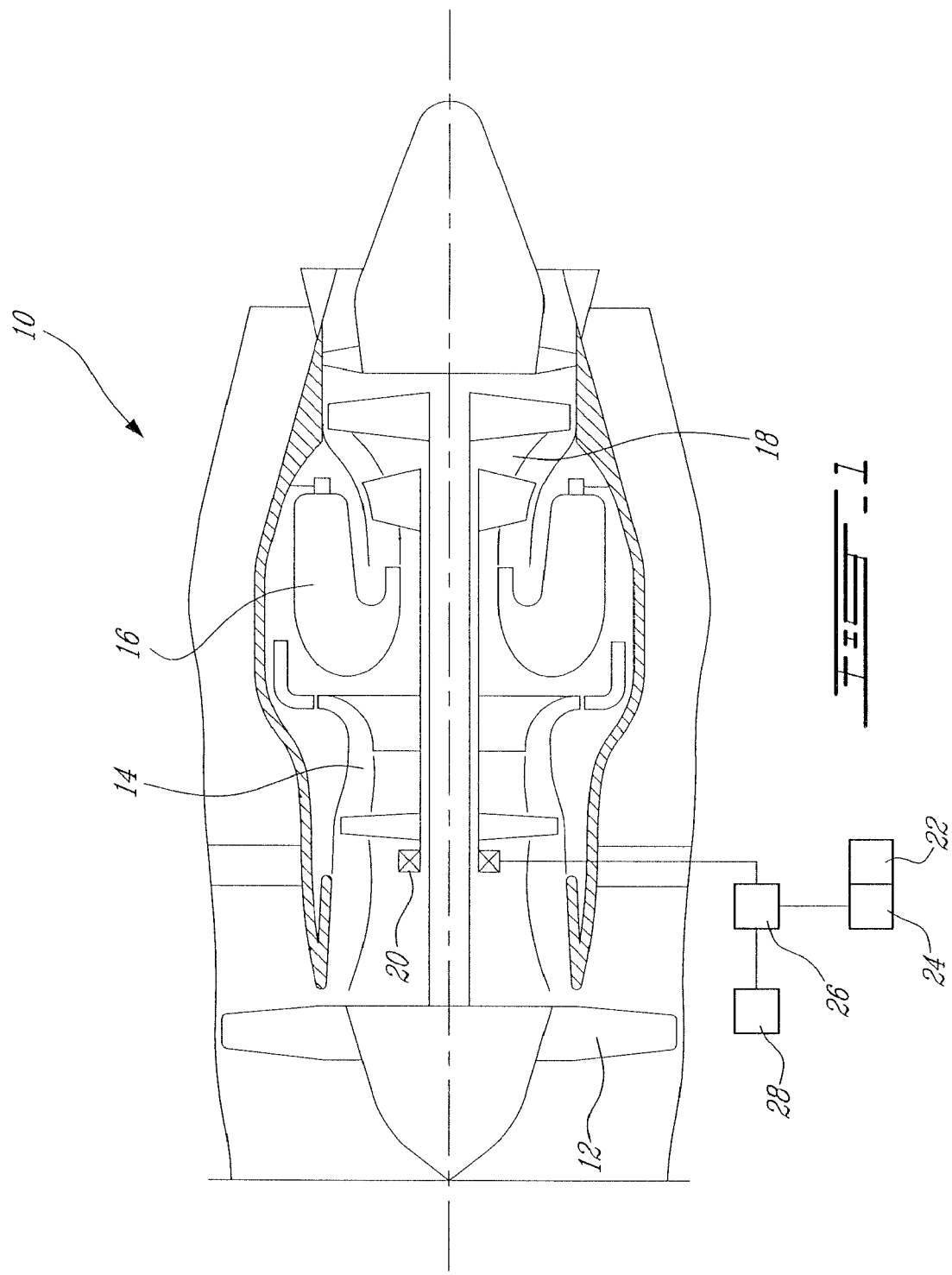
FIG. 1 is a schematic view illustrating an a gas turbine engine incorporating the present invention.

FIG. 1 schematically illustrates an example of a gas turbine engine 10 of a type preferably provided for use in subsonic flights. The engine 10 generally comprises in serial flow communication a fan 12 through which ambient air is propelled, a multi-stage compressor 14 for pressurizing the air, a combustor 16 in which the compressed air is mixed with fuel and ignited for generating a stream of hot combustion gases, and a turbine section 18 for extracting energy from the combustion gases. The engine 10 also includes an embedded or integral starter-generator 20 which is oil-cooled and thus communicated with an oil supply 22 via and engine oil system (not shown). The engine oil system also communicates with a plurality of engine bearing cavities which house the main engine bearing (not shown), and includes at least one oil pump 24. Operation of the starter-generator 20 is controlled by a controller 26 to, in one mode, start the gas turbine engine, and in another mode, generate electricity for powering electrical systems, such as electric fuel pumps, electric oil pump 24, and other engine and aircraft services. Controller 26 also controls at least electric oil pump 24. The controller 26 communicates with a power source 28, such as a battery or auxiliary power unit, to provide power during starting. This invention applies to other gas turbines, as well, such as turboprops and turbo-shaft engines.

In start-up, electrical power from power source 28 is provided by controller 26 to drive starter-generator 20. As starter-generator 20 operates, the machine tends to heat up, and therefore it is desirable to circulate cooling oil to the starter-generator 20. For economy of weight and complexity, preferably the oil used for cooling starter-generator 20 is obtained from the general oil system of the engine. However, in order to alleviate the problem of bearing cavity flooding if the engine oil system were fully powered up during starting, the present invention instead provides intermittent oil flow pulses, sufficient to cool the starter-generator 20 and yet insufficient to undesirably flood the bearing cavities, at least until such time as the air pressure in bearing cavities is sufficient to seal them. To do so, the controller 26, which can be for example the electronic engine control (EEC), can be provided with software instructions to command the electric oil pump 24 to intermittently pulse the oil supply during engine start, as mentioned the pulsing large enough to permit extended motoring of the engine without overheating the starter-generator 20, and yet small enough to prevent bearing cavity flooding. For instance, instead of providing a full flow, the oil pump can be operated intermittently for a short period of time, thus providing short, limited burst of oil in order to lower the initial oil flow to the bearing cavities. Normal operation of the oil pump may then begin after the start-up, either instantly or progressively (i.e. the length and/or strength of the intermittent bursts can gradually be extended to transition to normal operation). Maximum oil flow is not required, and in fact is not desired, for the bearings until the engine compressor reaches sufficient pressure to provide bearing cavity sealing air pressure. Thus pulsing the pump operation can provide intermittent oil pressure for cooling, without flooding the bearing cavities.

Figure 2:
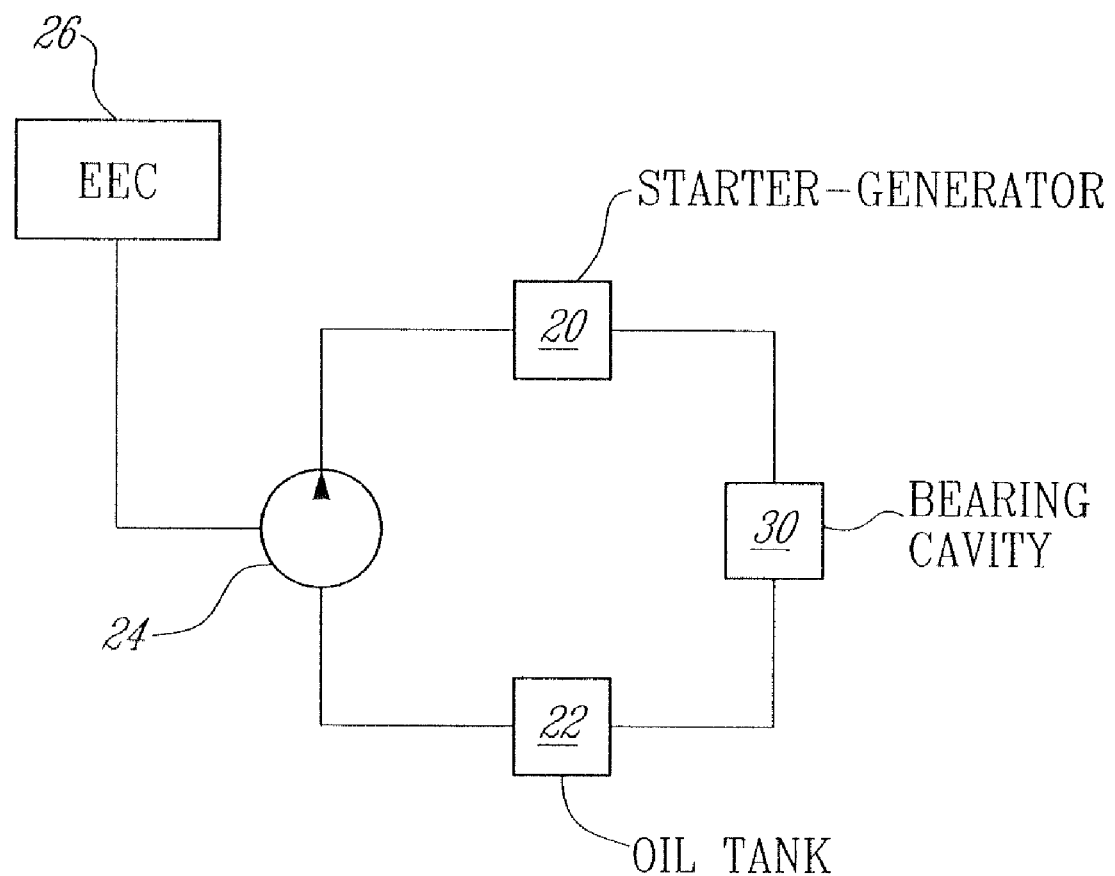
FIG. 2 is a block diagram that schematically illustrates one possible embodiment of an arrangement to carry out the improved method.
Figure 3:
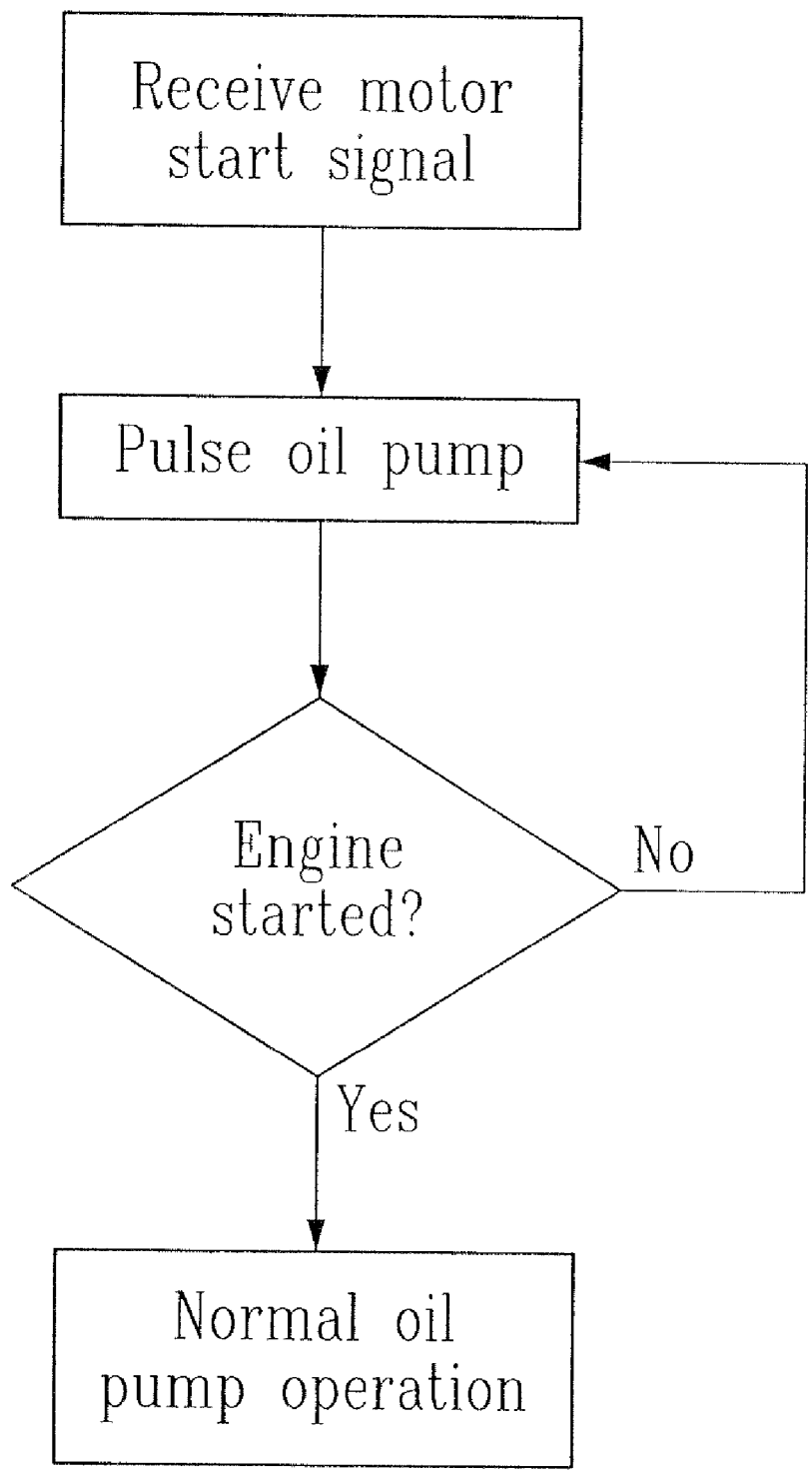
FIG. 3 is a block diagram showing an example of the improved method.

FIGS. 2 and 3 schematically illustrate possible examples of arrangement for performing the method. It should be noted that these figures are schematic in nature since other elements would be provided in a complete system, such as an oil cooler, a strainer, etc.

FIG. 2 shows the EEC 26 that is electrically connected to the oil pump 24 providing oil to starter-generator 20, at least one bearing cavity 30 and an oil tank 22. FIG. 3 shows a block diagram according to the described method.

Overall, the present invention provides a way to supply oil to portions of the engine during start-up and yet provide means to prevent bearing flooding without completely interrupting the supply of oil to the bearings or any other location.

The above description is meant to be exemplary only, and one skilled in the art will recognize that other changes may also be made to the embodiments described without departing from the scope of the invention disclosed as defined by the appended claims. For instance, although oil supply on start-up is described, the present invention may also be employed on engine shut down to supply cooling oil to the starter-generator 20 during engine run down. The present system may also be used to supply cooling oil to other motors, generators or electrical or electronic equipment, and is not limited to the starter-generator alone. Still other modifications which fall within the scope of the present invention will be apparent to those skilled in the art, in light of a review of this disclosure, and such modifications are intended to fall within the appended claims.

What is claimed is:

1. A method of operating a gas turbine engine having a combustor and at least one turbine shaft drivingly connected to an electric machine, the engine also having an oil system communicating with an electric oil pump, at least one bearing cavity of the engine and a coolant passage of the electric machine, the method comprising;
    rotating the shaft while the combustor is unlit;
    controlling the oil pump to intermittently provide oil flow to the oil system for cooling the electric machine.

2. The method as defined in claim 1 wherein the oil pump is intermittently operated to thereby intermittently provide oil flow.

3. The method as defined in claim 1 wherein the oil pumped is insufficient to flood the bearing cavities.

4. The method as defined in claim 1 wherein the electric machine is operated as a motor to rotate the shaft.

5. The method as defined in claim 1 wherein the intermittent oil flow is provided on engine start-up and the machine is a starter motor.

6. The method as defined in claim 1 wherein the intermittent oil flow is provided on engine run-down and the machine is an electric generator.

7. The method of claim 1 further comprising the step of providing intermittent oil flow to cool the oil pump.

8. A method of operating a gas turbine engine having a motor/generator drivingly connected to a turbine shaft, the engine having an oil system communicating with an electric oil pump, at least one bearing cavity of the engine and a coolant passage of the motor/generator, the method comprising;
    rotating the shaft with the motor/generator;
    pumping oil to provide an intermittent oil flow to the oil system;
    providing pumped oil to the motor/generator for cooling;
    lighting the engine; and then
    pumping oil to provide a continuous oil flow to the oil system.

9. The method of claim 8 wherein the step of providing a continuous oil flow is performed after the engine has started.

10. The method of claim 8 further comprising the steps of shutting the engine down, and pumping oil provide an intermittent oil flow to the oil system upon engine shutdown.

11. The method of claim 8 wherein the intermittent oil flow is insufficient to flood the bearing cavities.

12. A method of operating a gas turbine engine having a combustor and at least one electric machine, the engine having an oil system communicating with an electric oil pump, at least one bearing cavity of the engine and a coolant passage of the electric machine wherein the at least one electric machine includes the oil pump, the method comprising pumping oil intermittently to the oil system to cool the electric machine.

13. The method of claim 12 wherein oil is pumped intermittently when the combustor is unlit.

* * * * *